(12) United States Patent
Park et al.

(10) Patent No.: US 8,849,252 B2
(45) Date of Patent: Sep. 30, 2014

(54) MOBILE DEVICE HAVING MESSENGER FUNCTION AND RELATED SUPPORTING METHOD

(75) Inventors: Youn Ho Park, Gyeonggi-do (KR); Seung Wook Han, Gyeonggi-do (KR); Kyoung Won Kim, Seoul (KR); Hyoung Joo Nam, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 464 days.

(21) Appl. No.: 12/819,269

(22) Filed: Jun. 21, 2010

(65) Prior Publication Data

US 2010/0323752 A1 Dec. 23, 2010

(30) Foreign Application Priority Data

Jun. 22, 2009 (KR) .......................... 10-2009-0055595

(51) Int. Cl.
| | |
|---|---|
| *H04L 12/58* | (2006.01) |
| *H04M 1/725* | (2006.01) |
| *H04L 29/08* | (2006.01) |
| *H04W 76/00* | (2009.01) |
| *H04W 4/10* | (2009.01) |

(52) U.S. Cl.
CPC .............. *H04L 67/24* (2013.01); *H04L 12/5895* (2013.01); *H04L 12/5815* (2013.01); *H04L 51/043* (2013.01); *H04W 76/005* (2013.01); *H04W 4/10* (2013.01)
USPC .................. 455/412.1; 455/412.2; 455/414.1; 455/414.2

(58) Field of Classification Search
USPC ............. 455/550.1, 414.1, 459; 709/206, 224
See application file for complete search history.

(56) References Cited

U.S. PATENT DOCUMENTS

| 7,269,162 | B1 * | 9/2007 | Turner .......................... 370/352 |
|---|---|---|---|
| 7,493,390 | B2 * | 2/2009 | Bobde et al. .................. 709/224 |
| 7,711,815 | B2 * | 5/2010 | Garg et al. .................... 709/224 |
| 7,734,697 | B2 * | 6/2010 | Blohm .......................... 709/206 |
| 8,108,516 | B2 * | 1/2012 | Zmolek ......................... 709/224 |
| 8,391,892 | B2 * | 3/2013 | Karlsson et al. ........... 455/456.2 |
| 8,554,185 | B2 * | 10/2013 | Kim ........................... 455/414.1 |
| 2006/0129643 | A1 * | 6/2006 | Nielson et al. ................ 709/206 |
| 2006/0195591 | A1 * | 8/2006 | Kim et al. ...................... 709/227 |
| 2007/0233859 | A1 * | 10/2007 | Zhao et al. ..................... 709/224 |
| 2007/0240189 | A1 * | 10/2007 | Paila ............................... 725/62 |
| 2008/0010301 | A1 * | 1/2008 | Tian et al. ....................... 707/10 |
| 2008/0091786 | A1 * | 4/2008 | Jhanji ............................ 709/206 |
| 2009/0275314 | A1 * | 11/2009 | Cotevino et al. ........... 455/414.2 |
| 2009/0282005 | A1 * | 11/2009 | Kim et al. ......................... 707/3 |
| 2009/0292769 | A1 | 11/2009 | Matsuzawa |
| 2010/0227583 | A1 * | 9/2010 | Roy et al. ................... 455/404.1 |
| 2010/0238919 | A1 * | 9/2010 | Froelich ........................ 370/352 |

FOREIGN PATENT DOCUMENTS

| JP | 2004-259194 A | 9/2004 |
|---|---|---|
| WO | 2007/046364 A1 | 4/2007 |

\* cited by examiner

*Primary Examiner* — Magdi Elhag
(74) *Attorney, Agent, or Firm* — Cha & Reiter, LLC (57) ABSTRACT

A mobile device having a messenger function and a method for supporting such a messenger function is provided. When a messenger function is activated, the mobile device receives messenger data from a presence server. This messenger data includes state information about other mobile devices connected to the presence server. Then the mobile device classifies the received message data according to at least one criterion among a device, a time, and a modified time, and then stores it as history data. Also, at a user's request, the mobile device outputs the history data of a selected other mobile device.

17 Claims, 5 Drawing Sheets

MOBILE DEVICE HAVING MESSENGER FUNCTION AND RELATED SUPPORTING METHOD

CLAIM OF PRIORITY

This application claims, pursuant to 35 USC 119(a), priority to, and the benefit of the earlier filing date of, that patent application entitled "Mobile Device Having a Messenger Function and Related Supporting Methods," filed in the Korean Patent Office on Jun. 22, 2009 and afforded serial number 10-2009-0055595, the entire contents of which are incorporated by reference, herein.

BACKGROUND OF THE INVENTION

1. Field of the Invention

The present invention relates to the field of mobile devices and, more particularly, to a mobile device having a function of a messenger service based on an IP multimedia service (IMS).

2. Description of the Related Art

Mobile device have come to have a variety of useful functions thanks to amazing advances in related technologies. Accordingly, users of such mobile devices can use and access information in various forms of voice, text, graphic, etc. and also enjoy music, broadcast, game, etc. Furthermore, most mobile devices have functions of a digital camera and a camcorder.

Also, some mobile devices can offer a function of a short distance communication or a near field communication in addition to the inherent function of mobile communications. In addition, some mobile devices allow wireless access to the Internet.

Particularly, there is a conventional mobile device which supports a messenger function based on IMS. However, a currently available IMS-based messenger function of a conventional mobile device is limited to only transmit and receive messages inputted by a user and information about a state of a mobile device. Namely, such a messenger function is not much different from a function of a normal message service in a mobile communication system. So there is a rising need for more useful and improved IMS-based messenger function.

BRIEF SUMMARY OF THE INVENTION

Accordingly, the present invention is to address the above-mentioned problems and/or disadvantages and to provide at least the advantages described below.

An aspect of the present invention is to provide a new and advanced messenger service function of a mobile device by receiving, storing and controlling state information about other mobile devices and, thus, by supporting a history viewing for respective individual mobile devices.

According to one aspect of the present invention, provided is a method for supporting a messenger function of a mobile device, the method comprising: receiving messenger data from a presence server; retrieving state information about at least one other mobile device from the received messenger data; arranging the retrieved state information in the order of time by each other mobile device; and storing the arranged state information as history data, wherein the state information includes at least one of: an access log of each other mobile device to the presence server, an icon data selected by a user of each other mobile device, a comment data inputted by the user of each other mobile device, and a location data of each other mobile device.

According to another aspect of the present invention, provided is a mobile device supporting a messenger function, the mobile device comprising: a radio frequency unit configured to receive messenger data from a presence server; a control unit configured to retrieve state information about at least one other mobile device from the received messenger data, to arrange the retrieved state information in the order of time by each other mobile device, and to control the arranged state information to be stored as history data; and a memory unit configured to store the history data, wherein the state information includes at least one of: an access log of each other mobile device to the presence server, an icon data selected by a user of each other mobile device, a comment data inputted by the user of each other mobile device, and a location data of each other mobile device.

Another aspect of the invention, includes a mobile device comprises a Radio Frequency unit; and a processor in communication with a memory, the memory including code which when accessed by the processor causes the processor to: receive message data from a presence server through the RF unit; retrieve state information about at least one other mobile device from the received messenger data; arrange the retrieved state information in an order of time by each other mobile device; and store the arranged information as history data in the memory, wherein the state information includes at least one of: an access log of each other mobile device to the presence server, an icon data selected by a user of each other mobile device, a comment data inputted by the user of each other mobile device, and a location data of each other mobile device.

The aforesaid method and device may allow a user to easily check history data, such as a current state and its variations, about a selected one of the other mobile devices.

Other aspects, advantages, and salient features of the invention will become apparent to those skilled in the art from the following detailed description, which, taken in conjunction with the annexed drawings, discloses exemplary embodiments of the invention.

DETAILED DESCRIPTION OF THE INVENTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be understood and will convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
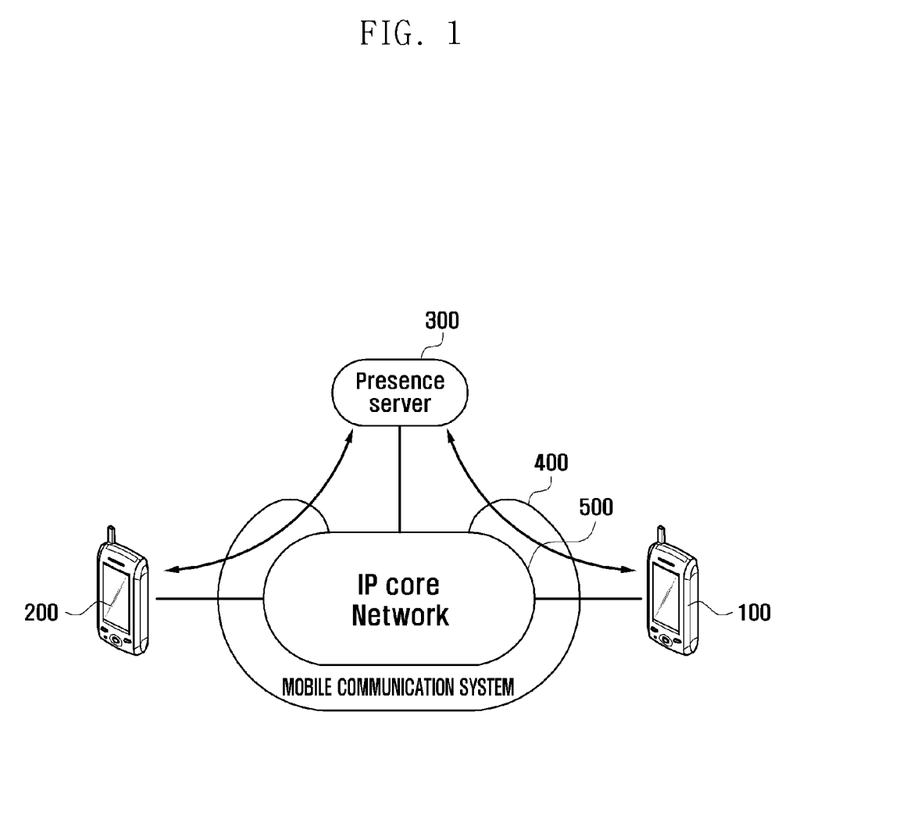
FIG. 1 is a schematic view illustrating the configuration of a system for supporting a messenger function of a mobile device in accordance with an exemplary embodiment of the present invention.

FIG. 1 is a schematic view illustrating the configuration of a system for supporting a messenger function of a mobile device in accordance with an exemplary embodiment of the present invention.

Referring to FIG. 1, a messenger function supporting system for a mobile device may be composed of a first mobile device 100, a second mobile device 200, a mobile communication system 400, an IP core network 500, and a presence server 300.

It is hereinafter supposed that the second mobile device 200 has transmitted state information to the presence server 300 through the mobile communication system 400 and the IP core network 500 and can offer periodically its state information to the presence server 300. It is therefore supposed that the second mobile device 200 is maintained online by means of transmission of state information. Although the second mobile device 200 will be described as a single entity, a plurality of second mobile devices may also be used. Namely, the second mobile device 200 may be interpreted as one or more mobile devices which have transmitted their own state information to the presence server 300. Similarly, one or more presence servers may be used. If there are several presence servers which support the same service functions, the respective presence servers may share state information of each mobile device or, if necessary, may send an inquiry to other presence server in order to perform a search for state information of mobile devices.

In this system, the first mobile device 100 accesses the IP core network 500 through the mobile communication system 400. Here, based on IP address of a specific presence server 300, the first mobile device 100 may transmit data to that presence server 300. The IP core network 500 delivers such data to the presence server 300 by using an IP address contained in the data that the first mobile device 100 transmits. The presence server 300 receives the data from the first mobile device 100 via the IP core network 500. The presence server 300 then offers state information about other mobile devices recorded in the received data to the first mobile device 100. Thereafter, the first mobile device 100 classifies state information received from the presence server 300 according to at least one criterion among a device, a time, and a modified time of state information. Then the first mobile device 100 stores the classified state information as history data. Meanwhile, if state information about the second mobile device 200 is modified, the second mobile device 200 transmits notification data to the presence server 300. Then the presence server 300 offers the modified state information about the second mobile device 200 to the other mobile devices including the first mobile device 100. Thus, the first mobile device 100 can add modified state information about a second mobile device 200 to its own history data. Thereafter, if there is a user's request for viewing history data through a menu or key input, the first mobile device 100 may output the requested history data on a display unit.

Although the first and second mobile devices 100 and 200 are connected to the IP core network 500 through the mobile communication system 400, this is exemplary only and not to be considered as a limitation of the present invention. In another embodiment, such mobile devices can access the IP core network 500 without the mobile communication system 400. In this case, the messenger function supporting system may offer wireless access points (not shown), and each mobile device may access the IP core network 500 via such wireless access points without using the mobile communication system. Practically, the mobile device transmits and receives data to and from the presence server 300 through the IP core network 500 connected to a number of access points. Therefore, in the messenger function supporting system of this invention, the mobile communication system 400 and the IP core network 500 may be replaced with any other network elements that allow transmission and reception of data between the mobile device and the presence server 300.

Now, data transmission among major elements of the aforesaid messenger function supporting system will be described in detail.

Figure 2:
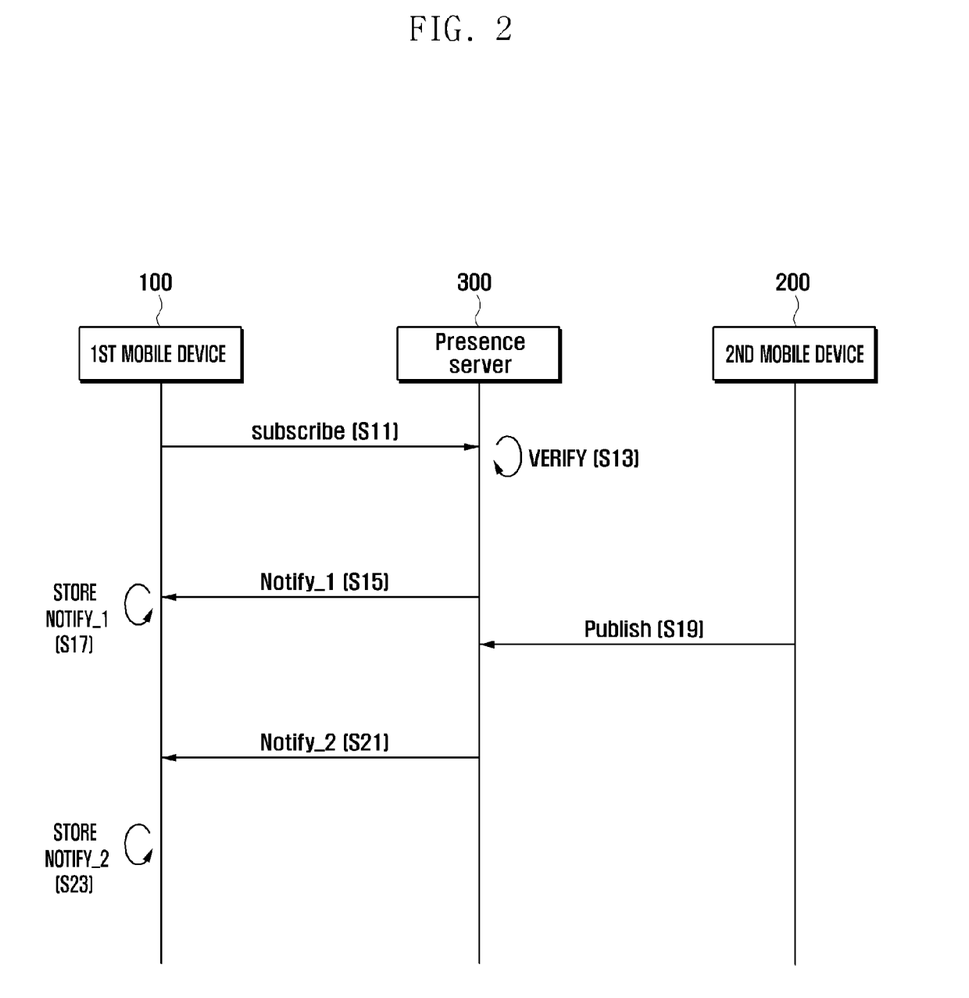
FIG. 2 is a view illustrating a flow of signals among elements of the system shown in FIG. 1.

FIG. 2 is a view illustrating a flow of signals among elements of the system shown in FIG. 1.

It is hereinafter supposed that the respective mobile devices are subscribers of a service offered by the presence server 300. It is also supposed that the second mobile device 200 establishes a channel with the presence server 300 and then transmits state information to the presence server 300 at regular intervals or when state information is modified. State information includes at least one of: an access log of a mobile device to the presence server, an icon data selected by a user, a comment data inputted by a user, and a location data of a mobile device.

Referring to FIG. 2, at the outset, the first mobile device 100 transmits access data (Subscribe) for access to the presence server 300 (step S11). Access data may include certification data and messenger list data of the first mobile device 100. Messenger list data includes information about other mobile devices registered in a messenger by the first mobile device 100.

When receiving access data from the first mobile device 100, the presence server 300 verifies whether the first mobile device 100 is a subscriber of a messenger service by using the certification data included in received access data (step S13). In this step S13, the presence server 300 may check the messenger data to be transmitted to the first mobile device 100 verified through the access data. Here, messenger data represents state information about other mobile devices.

Thereafter, the presence server 300 transmits the first messenger data (Notify_1) to the first mobile device 100 (step S15). Here, the first messenger data corresponds to state information about other mobile devices. Then the first mobile device 100 stores the first messenger data (Notify_1) received from the presence server 300 in a memory unit (step S17). In this step, when there is any history data earlier stored, the first mobile device 100 may add the first messenger data (Notify_1) to the history data.

For example, if three other mobile devices are recorded in the messenger list data of the first mobile device 100, the presence server 300 can recognize these mobile devices by means of access data received from the first mobile device 100 and then check state information about the three mobile devices. Thereafter, the presence server 300 transmits the first messenger data (Notify_1) including state information about the three mobile devices to the first mobile device 100. Meanwhile, if state information about the three mobile devices has already been stored as history data, the first mobile device 100 can add the first messenger data (Notify_1) to the earlier stored history data. At this time, the first mobile device 100 may classify state information about respective mobile devices in the first messenger data (Notify_1) and then may orderly add classified state information to the history data.

In addition, the second mobile device 200 may modify its own state information. Specifically, the second mobile device 200 can change at least parts of its state information, and in this case a messenger application module of the second mobile device 200 can verify a modification of state information. Therefore, the second mobile device 200 may transmit modified data (Publish) corresponding to a modification of state information to the presence server 300 (step S19).

Then the presence server 300 receiving modified data from the second mobile device 200 transmits it to other mobile devices. Here, modified data may include messenger list data of the second mobile device 200. Therefore, when receiving modified data, the presence server 300 generates the second messenger data (Notify_2) on the basis of the received modified data and transmits it to respective mobile devices recorded in messenger list data of the second mobile device 200 (step S21).

Therefore, the first mobile device 100 receives the second messenger data (Notify_2) from the presence server 300 and stores it in a memory unit (step S23). In this step, the first mobile device 100 may add the second messenger data (Notify_2) to the history data as previously discussed in step S17.

Thereafter, when receiving an input signal for a history data search from a user, the first mobile device 100 controls a display unit to output the stored history data. The output of history data will be described later in detail.

Figure 3:
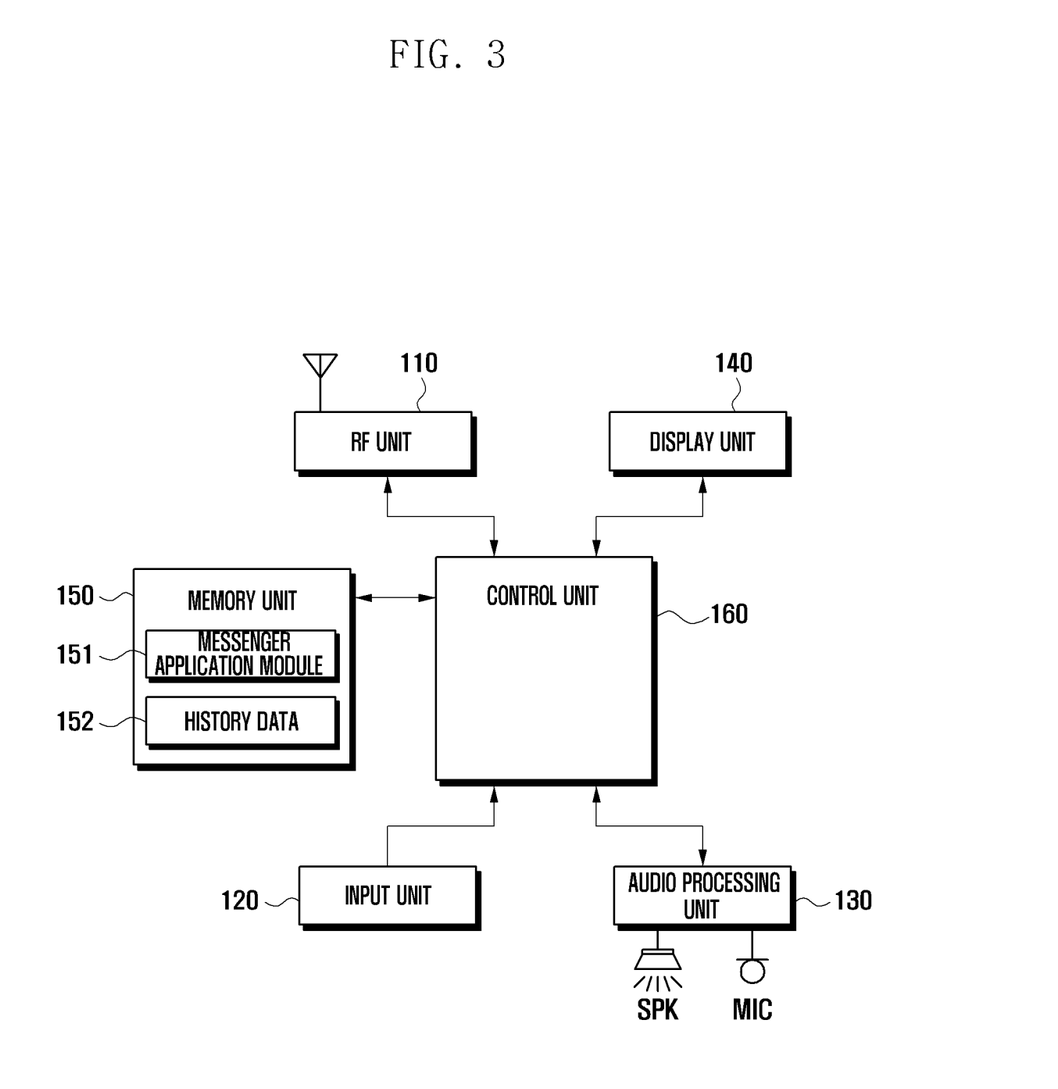
FIG. 3 is a block diagram illustrating the configuration of a mobile device having a messenger function in accordance with an exemplary embodiment of the present invention.

FIG. 3 is a block diagram illustrating the configuration of a mobile device having a messenger function in accordance with an exemplary embodiment of the present invention. The configuration shown in FIG. 3 may be common configuration of the aforesaid first and second mobile devices. Hereinafter, the aforesaid first and second mobile devices will be generically referred to as a mobile device.

Referring to FIG. 3, the mobile device includes a radio frequency (RF) unit 110, an input unit 120, an audio processing unit 130, a display unit 140, a memory unit 150, and a control unit 160.

The mobile device having the above elements may activate a messenger application module stored in the memory unit 150, depending on an input signal created by a user's request in the input unit 120. After the messenger application module is activated, the mobile device executes a process for accessing the presence server. This access process may be predefined or depend on a user's input. For access, the mobile device should be a subscriber of a particular service that allows for accessing the presence server. If not a subscriber, a joining process may be required.

After accessing the presence server, the mobile device offers access data to the presence server. Then the presence server certifies the mobile device on the basis of the access data and sends messenger data corresponding to messenger list data in the access data to the mobile device. Here, the messenger list data may be information, e.g., phone numbers, about other mobile devices specified in the mobile device. Also, the messenger data may be state information and available service information about respective other mobile devices.

State information includes an access state, an icon, a comment, and location data. Available service information indicates whether a voice call, a video call, an email and a push-to-talk (PTT) service is available for use.

The mobile device receiving the messenger data from the presence server may form a messenger user interface (UI) depending on the received messenger data. That is, the mobile device may generate a messenger screen UI after receiving an input signal for activating the messenger application module from a user. Then, after receiving messenger data from the presence server, the mobile device may reorganize the messenger screen UI on the basis of the received messenger data. Meanwhile, the mobile device may separately store state information contained in the messenger data in the memory unit 150 and also may store as history data after classifying state information according to at least one criterion such as a device, a time, and a modified time. Thereafter, when a specific mobile device is selected, the mobile device outputs state information about the elected device in the order of time. When a user's request is delivered through the input unit 120, the mobile device then outputs the history data on the display unit 140. Therefore, a user of the mobile device can easily check a current state and its modified history about a selected other mobile device. This may not only promote exchanges based on a messenger function, but also raise the interest level.

Now, each element of the mobile device will be described in detail.

The RF unit 110 establishes a communication channel with a base station (not shown) in order to perform a data communication and/or a voice call with any other mobile device. For this, the RF unit 110 may include an RF transmitter (not shown) which upwardly converts the frequency of signals to be transmitted and amplifies the up-converted signals, and an RF receiver (not shown) which amplifies received signals with low-noise and downwardly converts the frequency of the received signals. Particularly, the RF unit 110, in an embodiment of this invention, transmits access data for access to the presence server at a user's request, receives messenger data related to other mobile devices from the presence server, and delivers received messenger data to the memory unit 150 under the control of the control unit 160. Additionally, the RF unit 110 may receive modified messenger data from the presence server when any mobile device connected to the presence server modifies its messenger data. Modification of messenger data may be a change between online (i.e., connection with messenger) and offline (i.e., disconnection from messenger), a change of icons, and a change of comments.

The input unit 120 includes a plurality of normal input keys and special function keys (not shown) which are configured to receive user's instructions. The function keys may have navigation keys, side keys, shortcut keys, and any other special keys. The input unit 120 creates various key signals in association with user's instructions and delivers them to the control unit 160. Particularly, the input unit 120 in an embodiment of this invention may create an input signal for activating the messenger application module or selecting a related menu or hot key, an input signal for searching for history data of a specific mobile device, an input signal for deleting history data, and the like according to a user's control.

The audio processing unit 130 outputs audio signals received through the RF unit 110 to a speaker (SPK) and sends audio signals inputted from a microphone (MIC) through the RF unit 110. Particularly, the audio processing unit 130 in an embodiment of this invention may offer various sound effects related to messenger operation together with the messenger application module. For instance, the audio processing unit 130 may output a specific sound effect when any other mobile device registered in the messenger list data is changed from offline to online. Also, the audio processing unit 130 may output a specific sound effect when there is a message received from any other mobile device. Such sound effects may be inactivated according to a user's setting.

The display unit 140 represents a variety of information on a screen in association with the operation of the mobile device. The display unit 140 may be formed of a liquid crystal display (LCD), an organic light emitting device (OLED), or any other equivalent displays. Also, the display unit 140 may be fabricated in a touch-based form, such as a touch screen, which has an input function in addition to a display function. Particularly, the display unit 140 in an embodiment of this invention outputs a screen for representing a state of a messenger connection of a specific mobile device, a screen for offering history data, and the like. A related user interface will be described later in detail.

The memory unit 150 stores a variety of applications and data required for the operation of the mobile device. The memory unit 150 may consist of a program region (not shown) and a data region (not shown).

The program region stores an operating system (OS) for booting the mobile device 100, an application for playing multimedia contents, and the like. Particularly, the program region in an embodiment of this invention stores the messenger application module which is an application program for supporting a messenger function 151 of the mobile device. The messenger application module may include a routine for transmitting access data for access to the presence server, a routine for processing messenger data received from the presence server, a routine for storing the received messenger data as history data, and a routine for outputting history data on the display unit 140 in response to a related input signal.

The data region stores data created while the mobile device is used. Specifically, the data region may store user data associated with various optional functions the mobile device offers, including audio/video data, phonebook data, contents, etc. Particularly, the data region in an embodiment of this invention stores data associated with a messenger function executed according to activation of the messenger application module. For instance, the data region may store instant messages, icon data, comment data, location data, etc. Here, icon data, comment data and location data may be contained in access data transmitted to the presence server. Additionally, the data region may store messenger list data which is information about a list of other mobile devices from which instant messages are transmitted and received on the basis of a messenger. Therefore, messenger list data may contain phone numbers or IP addresses of other mobile devices. Meanwhile, the data region stores history data 152 which is created based on messenger data received from the presence server. Here, messenger data may contain any data received from the presence server when the mobile device makes an initial access to the presence server, and data generated by modification of state information of other mobile device. When receiving messenger data from the presence server, the mobile device retrieves selected data, such as icon data and comment data of other mobile device, from the messenger data. Then the mobile device arranges the retrieved data in the order of time and stores it as link data of other mobile device.

The control unit 160 controls the overall operation of the mobile device and signal flow between internal blocks and also controls the data processing. Particularly, the control unit 160, in an embodiment of this invention, activates the messenger application module 151 stored in the memory unit 150 according to a related input signal from the input unit 120, and also controls the display unit 140 to output a messenger UI in order for a user to use a messenger function executed by means of the messenger application module. In addition, if there is an input signal for requesting access to the presence server after activation of the messenger application module 151, the control unit 160 controls the creation of the access data and also controls transmission of access data to the presence server through the RF unit.

Furthermore, the control unit 160 forms a messenger UI depending on the messenger data received from the presence server. Then the control unit 160 retrieves state information about other mobile devices from the received messenger data and, if there is earlier stored state information, updates the history data 152 in the order of time. If there is no previously stored state information, the control unit 160 creates history data after classifying the state information by device and arranging it in the order of time. Thereafter, the control unit 160 controls the display unit 140 to output the history data 152 at a user's request.

Figure 4:
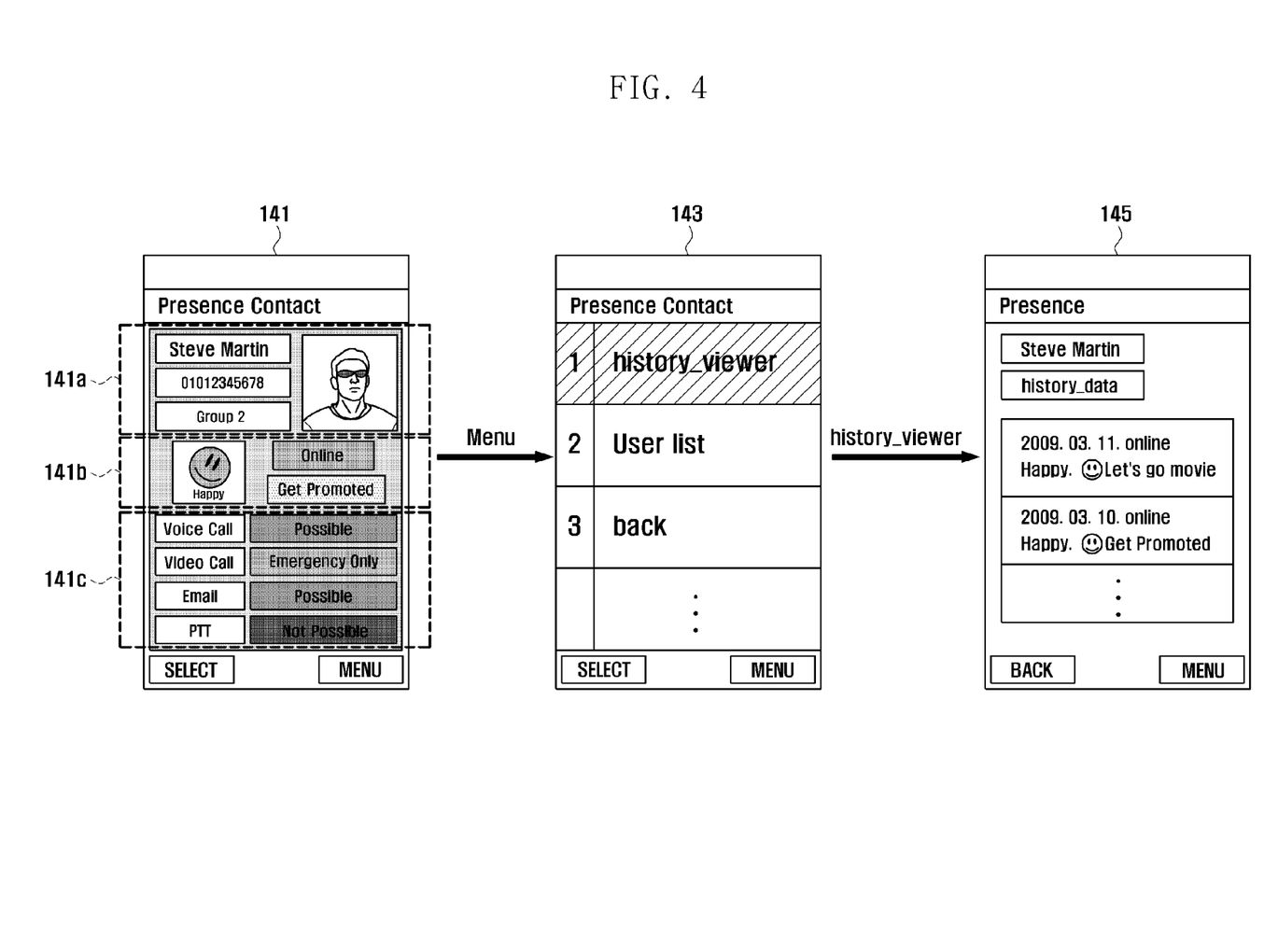
FIG. 4 is an example view illustrating a screen user interface for using a messenger function of a mobile device in accordance with another exemplary embodiment of the present invention.

FIG. 4 is an example view illustrating a screen user interface for using a messenger function of a mobile device in accordance with another exemplary embodiment of the present invention.

Referring to FIG. 4, when a user offers an input signal for activating the messenger application module in order to use a messenger function, the mobile device outputs a messenger screen UI 141 formed on the basis of items related to a selected other mobile device. For this, the mobile device may output a menu page for selecting a messenger function. Also, the mobile device may offer a hot key to which an input signal for activation of a messenger function is assigned.

The messenger screen UI 141 is composed of a user data region 141a, a state information region 141b, and an available service information region 141c.

The user data region 141a may output a variety of data associated with a user of a selected other mobile device, such as a user name (e.g., "Steve Martin"), a phone number (e.g., "01012345678"), a messenger group (e.g., "Group 2"), and a user's image.

The state information region 141b may output an icon (e.g., a graphical image representing a smiling face) selected by a user of other mobile device, a current access state indicating whether the other mobile device is connected to the presence server (e.g., "Online"), and a comment inputted by a user of the other mobile device (e.g., "Get Promoted"). Here, if the selected other mobile device is not connected to the presence server, a current access state may indicate "Offline". Also, an icon and a comment contained in the state information region 141b may be changed in response to modifying instructions by a user of the other mobile device.

The available service information region 141c outputs possible service types in connection with the selected other mobile device. In addition, a state of each possible service type indicating activation or not may be presented. For instance, as possible service types and their state, the available service information region 141c may output "Voice Call—Possible", "Video Call—Emergency Only", "Email—Possible", and "PTT—Not Possible". Such possible service types and their state may be varied according to each of the other mobile devices. Here, the above service types are exemplary only and not to be considered as a limitation of this invention. In alternative embodiments, the available service information region 141c may add new service types or remove parts of the above service types.

Meanwhile, if a user wants to check history data of a selected other mobile device during use of a messenger function, a user activates a menu in the screen 141. Then the mobile device offers a menu screen UI 143 which contains a menu item of history viewer. As shown, this menu screen UI 143 may further contain other menu items such as "User list" and "Back".

Thereafter, if a user selects a menu item of history viewer in the menu screen UI 143, the mobile device offers a history screen UI 145 which outputs history data associated with the selected other mobile device. As shown, the history screen UI 145 offers history data of a selected device "Steve Martin" in the order of time. Here, the mobile device outputs state information which has been displayed in the state information region 141*b* of the previous screen UI 141, so a user can check variations in such state information in the order of time. Although in the above example a user can check history data of other mobile device through a menu screen after selecting a desired one of other mobile devices, this invention is not limited to that case. Alternatively, the mobile device may offer a menu for directly viewing history data in a list of other mobile devices registered in a messenger list data. So a user can immediately check history data of a desired other mobile device. In this case, the mobile device may launch a menu item of history viewer in response to a user's selection of a specific other mobile device.

Additionally, the mobile device may offer a hot key which allows a direct access to history viewer of other mobile devices. In this case, when a user activates a hot key, the mobile device may launch a list of other mobile devices. Then in response to a user's section of a specific other mobile device, the mobile device outputs history data of a selected other mobile device.

As discussed hereinbefore, the mobile device according to the present invention may offer screen user interfaces containing state information and its variations as history data in several cases, as follows. One case is that a desired one of the other mobile devices is selected in a list displayed and then a menu item of history viewer is selected. Another case is that a menu screen containing a menu item of history viewer is activated in a messenger screen formed in connection with a specific one of other mobile devices. Further another case is that a list of other mobile devices is outputted in response to an input signal for viewing history data and then a specific one of other mobile devices is selected in that list.

Heretofore, a system and a mobile device for supporting a messenger function are described. Now, a related method will be described.

Figure 5:
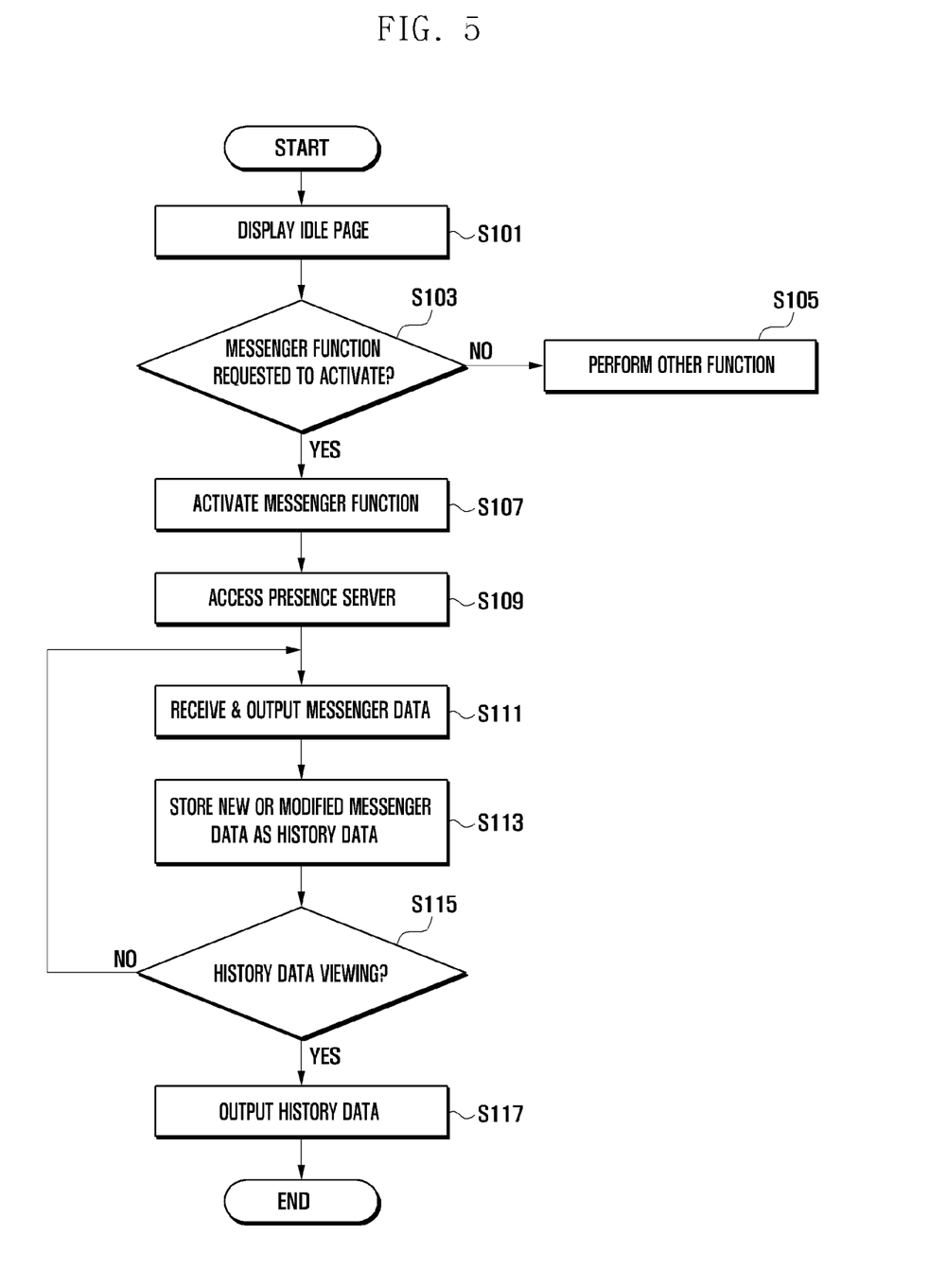
FIG. 5 is a flow diagram illustrating a method for supporting a messenger function of a mobile device in accordance with an exemplary embodiment of the present invention.

FIG. 5 is a flow diagram illustrating a method for supporting a messenger function of a mobile device in accordance with an exemplary embodiment of the present invention.

Referring to FIG. 5, when electric power is supplied, the mobile device initializes its elements and outputs a known idle or standby page on the display unit (step S101).

Then the mobile device determines whether there is a user's request for activating a messenger function (step S103). If a received input signal is related to other functions such as a call, a file search, a file play, a camera, etc., the mobile device performs the requested other function in response to such an input signal (step S105).

If a received input signal is related to activation of a messenger function, the mobile device performs a known process required for activating the messenger function (step S107). Namely, the mobile device loads and activates the messenger application module stored in the memory unit (see FIG. 3). Then the mobile device performs a process for accessing the presence server, such as creating access data and transmitting it to the presence server (step S109).

Thereafter, the mobile device receives messenger data from the presence server and also outputs a messenger UI formed on the basis of the received messenger data (step S111). The mobile device may organize and display a messenger screen UI 141 as described above in FIG. 4. Additionally, the mobile device creates or updates history data, depending on the messenger data received from the presence server (step S113). The messenger data may include new messenger data received when the mobile device accesses the presence server, and modified messenger data received according to the change of state information of other mobile devices. History data is state information including messenger an access log, icon data and comment data of other mobile devices and arranged in the order of time by the other mobile device.

Next, the mobile device determines whether there is a user's request for viewing history data (step S115). If there is no request, the mobile device returns to step S111 to continuously receive messenger data from the presence server. Also, if receiving any other request such as an input signal for transmitting instant messages, the mobile device controls transmission of the requested instant messages. And also, if receiving instant messages from other mobile devices, the mobile device controls the display unit to output the received instant messages.

If receiving a user's request for viewing history data in step S115, the mobile device controls the display unit to output state information, as requested history data, about a selected other mobile device in the order of time (step S117).

As fully discussed hereinbefore, in a messenger function the mobile device of this invention arranges state information about respective other mobile devices in the order of time and modified time, stores it as history data, and offers it to a user. Therefore, a user can easily become aware of changes in mental attitude or environment of users of other mobile devices. Also, this may raise the interest level of messenger service users.

The above-described methods operable in the controller 160, according to the present invention, can be realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, the computer, processor or dedicated hardware may be composed of at least one of a single processor, a multi-processor, and a multi-core processor.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method for supporting a messenger function of a mobile device, the method comprising:

accessing a presence server associated with the mobile device;

responsive to the accessing, automatically receiving, at the mobile device from the presence server, current messenger data including state information and available service information associated with at least one other mobile device;

automatically retrieving state information and available service information associated with the at least one other mobile device from the received current messenger data;

displaying a messenger screen user interface including at least some of the retrieved state information and the available service information contained in the messenger data;

storing the retrieved state information as history data comprising a history of state information associated with the at least one other mobile device;

receiving an input signal for viewing the history data associated with the at least one other mobile device; and outputting the history data on a display unit in response to the input signal, wherein the state information includes at least one of: an access log of each other mobile device to the presence server, an icon data selected by a user of each other mobile device, a comment data inputted by the user of each other mobile device, and a location data of each other mobile device, and wherein the available service information indicates whether at least one of a voice call, a video call, an email and a push-to-talk (PTT) service is available for use.

2. The method of claim 1, wherein the receiving of the input signal includes at least one of:

receiving an input signal for selecting a menu item of a history viewer after selecting a specific other mobile device in a list of at least one other mobile device;

receiving the input signal for activating a menu item of a history viewer in a messenger screen formed in connection with a specific other mobile device; and receiving the input signal for selecting a specific other mobile device in a list of other mobile devices outputted in response to another input signal for viewing the history data.

3. The method of claim 1, wherein the outputting of the history data includes:

outputting a user data region which offers at least one of a user name of a selected one of the other mobile devices, a phone number of the selected other mobile device, and an image linked to the selected other mobile device; and outputting a state information region which offers the state information arranged in a chronological order in connection with the selected other mobile device.

4. The method of claim 1, wherein the receiving of the current messenger data includes receiving the current messenger data from the presence server when at least one other mobile device modifies corresponding state information.

5. The method of claim 1, further comprising:

activating a messenger application module for activation of the messenger function; and outputting a messenger screen user interface upon activation of the messenger application module.

6. The method of claim 1, wherein the messenger screen user interface generated based on the state information and the available service information.

7. A mobile device supporting a messenger function, the mobile device comprising:

a radio frequency unit configured to receive current messenger data from a presence server;

a control unit configured to:

access the presence server;

responsive to the accessing, automatically receive, at the mobile device from the presence server, current messenger data including current state information associated with at least one other mobile device;

automatically retrieve state information and available service information associated with the at least one other mobile device from the received current messenger data;

display a messenger screen user interface including at least some of the retrieved state information and the available service information contained in the messenger data;

store the retrieved state information as history data comprising a history of state information associated with the at least one other mobile device;

a memory unit configured to store the history data;

an input unit configured to create an input signal for viewing the history data in response to a user's request; and a display unit configured to output the history data in response to the input signal, wherein the state information includes at least one of: an access log of each other mobile device to the presence server, an icon data selected by a user of each other mobile device, a comment data inputted by the user of each other mobile device, and a location data of each other mobile device, and wherein the available service information indicates whether at least one of a voice call, a video call, an email and a push-to-talk (PTT) service is available for use.

8. The mobile device of claim 7, wherein the input signal created by the input unit includes at least one of:

selecting a menu item of history viewer after selecting a specific other mobile device in a list of at least one other mobile device;

activating a menu item of history viewer in a messenger screen formed in connection with a specific other mobile device; and selecting a specific other mobile device in a list of other mobile devices outputted in response to another input signal for viewing the history data.

9. The mobile device of claim 7, wherein the display unit is further configured to output:

a user data region which offers at least one of: a user name of a selected one of the other mobile devices, a phone number of the selected other mobile device, and an image linked to the selected other mobile device; and a state information region which offers the state information arranged in a chronological order in connection with the selected other mobile device.

10. The mobile device of claim 7, wherein the radio frequency unit is further configured to receive the current messenger data from the presence server when at least one other mobile device modifies corresponding state information.

11. The mobile device of claim 7, wherein the memory unit includes a messenger application module for activation of the messenger function.

12. The mobile device of claim 11, wherein the control unit is further configured to reorganize a messenger screen user interface based on the state information and available service information contained in the messenger data after the messenger data is received.

13. A mobile device comprising:

a Radio Frequency (RF) unit; and a processor in communication with a memory, the memory including code which when executed by the processor causes the processor to:

access a presence server associated with the mobile device;

responsive to the accessing, automatically receive, at the mobile device, current messenger data associated with at least one other mobile device from the presence server through the RF unit;

automatically retrieve state information and available service information associated with the at least one other mobile device from the received current messenger data;

display a messenger screen user interface including at least some of the state information and available service information contained in the messenger data after the messenger data is received;

store the retrieved state information as history data comprising a history of state information associated with the at least one other mobile device arranged in chronological order;

receive an input signal for viewing the history data; and output the history data on a display unit in response to the input signal, wherein the state information includes at least one of: an access log of each other mobile device to the presence server, an icon data selected by a user of each other mobile device, a comment data inputted by the user of each other mobile device, and a location data of each other mobile device, and wherein the available service information indicates whether at least one of: a voice call, a video call, an email and a push-to-talk (PTT) service is available for use.

14. The mobile device of claim 13, wherein the receiving of the current messenger data includes receiving the current messenger data from the presence server when at least one other mobile device modifies corresponding state information.

15. The mobile device of claim 13, further comprising the processor accessing code to:
  activate a messenger application for activation of a messenger function.

16. The mobile device of claim 15, further comprising the processor accessing code to:
  reorganize the messenger screen user interface on the basis of the received state information and available service information contained in the messenger data.

17. The mobile device of claim 13, wherein the history data includes at least one of: a user name of a selected one of the other mobile devices, a phone number of the selected other mobile device, and an image linked to the selected other mobile device.

* * * * *